US009146966B1

(12) United States Patent
Popovici

(10) Patent No.: US 9,146,966 B1
(45) Date of Patent: Sep. 29, 2015

(54) CLICK OR SKIP EVALUATION OF PROXIMITY RULES

(71) Applicant: Google Inc., Mountain View, CA (US)

(72) Inventor: Dan Popovici, Cupertino, CA (US)

(73) Assignee: Google Inc., Mountain View, CA (US)

( * ) Notice: Subject to any disclaimer, the term of this patent is extended or adjusted under 35 U.S.C. 154(b) by 340 days.

(21) Appl. No.: 13/735,541

(22) Filed: Jan. 7, 2013

Related U.S. Application Data

(60) Provisional application No. 61/709,726, filed on Oct. 4, 2012.

(51) Int. Cl.
*G06F 17/30* (2006.01)

(52) U.S. Cl.
CPC ...... *G06F 17/3053* (2013.01); *G06F 17/30657* (2013.01)

(58) Field of Classification Search
CPC ............ G06F 17/3053; G06F 3/0481; G06F 17/30648
USPC ....................................................... 707/723
See application file for complete search history.

(56) References Cited

U.S. PATENT DOCUMENTS

| | | | |
|---|---|---|---|
| 4,164,025 A | 8/1979 | Dubnowski et al. | |
| 4,823,306 A | 4/1989 | Barbic et al. | |
| 5,724,571 A | 3/1998 | Woods | |
| 5,826,261 A | 10/1998 | Spencer | |
| 5,926,812 A | 7/1999 | Hilsenrath et al. | |
| 5,960,383 A | 9/1999 | Fleischer | |
| 5,987,457 A | 11/1999 | Ballard | |
| 6,006,222 A | 12/1999 | Culliss | |
| 6,006,225 A * | 12/1999 | Bowman et al. | ........................ 1/1 |
| 6,012,053 A | 1/2000 | Pant | |
| 6,014,665 A | 1/2000 | Culliss | |

(Continued)

FOREIGN PATENT DOCUMENTS

| | | |
|---|---|---|
| EP | 1505520 A3 | 5/2006 |
| WO | WO2006096842 A1 | 9/2006 |

OTHER PUBLICATIONS

Ananthanarayanan et al., "Rule based synonyms for entity extraction from noisy text", In Proceedings of the second workshop on Analytics for noisy unstructured text data, pp. 31-38, ACM, Jul. 2008.

(Continued)

*Primary Examiner* — Rehana Perveen
*Assistant Examiner* — Alexander Khong
(74) *Attorney, Agent, or Firm* — Fish & Richardson P.C.

(57) ABSTRACT

Methods, systems, and apparatus, including computer programs encoded on a computer storage medium, for click or skip evaluation of proximity rules. In one aspect, a method includes accessing query data that identifies, for a search query, a particular query term and other query terms included in the search query, search results, and a particular search result selected by a user. The method further includes determining, using the query data, that, (i) in text associated with the particular search result, the particular query term is separated from the other query terms by a minimum number of terms, and (ii) in text associated with a search result that was ranked higher than the particular search result, the particular query term is not separated from the other query terms by the minimum number of terms, then incrementing a click count for a query term proximity rule corresponding to the particular query term.

34 Claims, 10 Drawing Sheets

(56) References Cited

U.S. PATENT DOCUMENTS

| | | |
|---|---|---|
| 6,029,195 A | 2/2000 | Herz |
| 6,035,294 A | 3/2000 | Fish |
| 6,078,916 A | 6/2000 | Culliss |
| 6,169,986 B1 | 1/2001 | Bowman et al. |
| 6,182,067 B1 | 1/2001 | Presnell |
| 6,272,507 B1 | 8/2001 | Pirolli |
| 6,285,999 B1 | 9/2001 | Page |
| 6,289,353 B1 | 9/2001 | Hazlehurst et al. |
| 6,311,214 B1 | 10/2001 | Rhoads |
| 6,314,419 B1 | 11/2001 | Faisal |
| 6,360,215 B1 | 3/2002 | Judd |
| 6,405,175 B1 | 6/2002 | Ng |
| 6,421,675 B1 | 7/2002 | Ryan |
| 6,473,752 B1 | 10/2002 | Fleming |
| 6,480,837 B1 | 11/2002 | Dutta |
| 6,513,036 B2 | 1/2003 | Fruensgaard et al. |
| 6,636,848 B1 | 10/2003 | Aridor et al. |
| 6,732,088 B1 | 5/2004 | Glance |
| 6,772,150 B1 | 8/2004 | Whitman et al. |
| 7,062,561 B1 | 6/2006 | Reisman |
| 7,085,820 B1 | 8/2006 | Nickerson |
| 7,409,383 B1 | 8/2008 | Tong et al. |
| 7,480,652 B2 | 1/2009 | Wen |
| 7,562,069 B1 | 7/2009 | Chowdhury |
| 7,565,345 B2 | 7/2009 | Bailey et al. |
| 7,617,200 B2 | 11/2009 | Budzik |
| 7,620,628 B2 | 11/2009 | Kapur et al. |
| 7,636,714 B1 | 12/2009 | Lamping et al. |
| 7,716,216 B1 | 5/2010 | Harik |
| 7,788,261 B2 | 8/2010 | Hoeber et al. |
| 7,860,870 B2 | 12/2010 | Sadagopan |
| 7,925,498 B1 | 4/2011 | Baker et al. |
| 7,966,341 B2 | 6/2011 | Maghoul et al. |
| 8,001,118 B2 | 8/2011 | Dean |
| 8,037,086 B1 | 10/2011 | Upstill et al. |
| 8,041,730 B1 | 10/2011 | Upstill et al. |
| 8,065,316 B1 | 11/2011 | Baker et al. |
| 8,103,669 B2 | 1/2012 | Castellani et al. |
| 8,250,066 B2 | 8/2012 | Miedema |
| 8,316,007 B2 | 11/2012 | Liao |
| 8,321,201 B1 | 11/2012 | Baker et al. |
| 8,346,757 B1 | 1/2013 | Lamping |
| 8,352,469 B2 | 1/2013 | Rose |
| 8,392,443 B1 | 3/2013 | Allon et al. |
| 8,401,841 B2 | 3/2013 | Roitblat et al. |
| 8,429,184 B2 | 4/2013 | Ismalon |
| 8,463,782 B1 | 6/2013 | Upstill et al. |
| 8,498,974 B1 | 7/2013 | Kim |
| 8,504,562 B1 | 8/2013 | Ikeda et al. |
| 8,538,984 B1 | 9/2013 | Mahabal et al. |
| 8,600,973 B1 | 12/2013 | Popovici et al. |
| 8,620,915 B1 | 12/2013 | Brukman et al. |
| 8,631,019 B1 | 1/2014 | Shaw et al. |
| 8,645,390 B1 | 2/2014 | Oztekin |
| 8,762,363 B1 | 6/2014 | Koo et al. |
| 2002/0032735 A1 | 3/2002 | Burnstein et al. |
| 2002/0078045 A1 | 6/2002 | Dutta |
| 2002/0103798 A1 | 8/2002 | Abrol |
| 2002/0133483 A1 | 9/2002 | Klenk |
| 2002/0156816 A1 | 10/2002 | Kantrowitz et al. |
| 2003/0123443 A1 | 7/2003 | Anwar |
| 2003/0167266 A1 | 9/2003 | Saldanha et al. |
| 2004/0236730 A1 | 11/2004 | Frank |
| 2005/0076003 A1 | 4/2005 | DuBose et al. |
| 2005/0125392 A1 | 6/2005 | Curtis |
| 2006/0167842 A1 | 7/2006 | Watson |
| 2006/0253427 A1 | 11/2006 | Wu et al. |
| 2007/0005590 A1 | 1/2007 | Thrasher |
| 2007/0011154 A1 | 1/2007 | Musgrove et al. |
| 2007/0094234 A1* | 4/2007 | Wen et al. ............ 707/2 |
| 2007/0214131 A1 | 9/2007 | Cucerzan et al. |
| 2008/0040325 A1* | 2/2008 | Sachs et al. ............ 707/3 |
| 2008/0091670 A1 | 4/2008 | Ismalon |
| 2008/0097891 A1 | 4/2008 | Park |
| 2008/0114721 A1 | 5/2008 | Jones et al. |
| 2008/0114751 A1 | 5/2008 | Cramer et al. |
| 2008/0140641 A1 | 6/2008 | Wang |
| 2008/0140643 A1 | 6/2008 | Ismalon |
| 2008/0147638 A1 | 6/2008 | Hoeber et al. |
| 2008/0228754 A1 | 9/2008 | Frank |
| 2008/0235187 A1 | 9/2008 | Gade et al. |
| 2008/0270138 A1 | 10/2008 | Knight et al. |
| 2009/0006359 A1 | 1/2009 | Liao |
| 2009/0043749 A1 | 2/2009 | Garg et al. |
| 2009/0063431 A1 | 3/2009 | Erol et al. |
| 2009/0106221 A1* | 4/2009 | Meyerzon et al. ............ 707/5 |
| 2009/0119261 A1 | 5/2009 | Ismalon |
| 2009/0182734 A1 | 7/2009 | Wen |
| 2009/0198672 A1 | 8/2009 | Jones et al. |
| 2009/0313286 A1 | 12/2009 | Mishra et al. |
| 2010/0010968 A1 | 1/2010 | Redlich et al. |
| 2010/0125575 A1 | 5/2010 | Zaragoza |
| 2010/0138402 A1 | 6/2010 | Burroughs et al. |
| 2010/0257164 A1 | 10/2010 | Halverson et al. |
| 2010/0306229 A1 | 12/2010 | Timm et al. |
| 2011/0078049 A1 | 3/2011 | Rehman et al. |
| 2011/0179023 A1 | 7/2011 | Dean |
| 2011/0258149 A1 | 10/2011 | Kanungo et al. |
| 2012/0095951 A1 | 4/2012 | Ray |
| 2012/0158685 A1 | 6/2012 | White et al. |
| 2012/0158765 A1 | 6/2012 | Kumar et al. |
| 2012/0290637 A1 | 11/2012 | Perantatos |
| 2012/0303651 A1 | 11/2012 | Tao |
| 2012/0317088 A1 | 12/2012 | Pantel et al. |
| 2012/0323677 A1 | 12/2012 | Bottou |
| 2013/0041921 A1 | 2/2013 | Cooper et al. |
| 2013/0086509 A1 | 4/2013 | Satyanarayana et al. |
| 2013/0246383 A1 | 9/2013 | White et al. |

OTHER PUBLICATIONS

Efthimiadis, "Interactive Query Expansion: A User-Based Evaluation in a Relevance Feedback Environment," Journal of the American Society for Information Science, 51(11):989-1003, 2000, John Wiley & Sons, Inc.

Office Action issued in U.S. Appl. No. 13/661,734 on Apr. 14, 2014, 7 pages.

Notice of Allowance issued in U.S. Appl. No. 13/532,326 on Feb. 25, 2014, 5 pages.

Office Action issued in U.S. Appl. No. 13/532,326 on Oct. 24, 2013, 14 pages.

Office Action issued in U.S. Appl. No. 13/481,166 on Jun. 19, 2014, 8 pages.

Office Action issued in U.S. Appl. No. 13/651,688 on Apr. 7, 2014, 33 pages.

Office Action issued in U.S. Appl. No. 13/651,688 on Jan. 17, 2014, 31 pages.

Office Action issued in U.S. Appl. No. 13/727,968 on Aug. 19, 2014, 12 pages.

Office Action issued in U.S. Appl. No. 13/443,405 on Jun. 19, 2014, 10 pages.

Office Action issued in U.S. Appl. No. 13/302,935 on Jul. 11, 2014, 16 pages.

Notice of Allowance received in U.S. Appl. No. 13/342,560 on Jul. 24, 2013, 23 pages.

Office Action issued in U.S. Appl. No. 13/342,560 on Apr. 18, 2013, 14 pages.

Office Action issued in U.S. Appl. No. 13/342,560 on Nov. 26, 2012, 16 pages.

Office Action issued in U.S. Appl. No. 13/342,604 on Dec. 20, 2012, 13 pages.

Office Action issued in U.S. Appl. No. 13/342,604 on May 13, 2013, 12 pages.

Office Action issued in U.S. Appl. No. 13/564,882 on Jul. 1, 2014, 8 pages.

Huang et al., "Analyzing and Evaluating Query Reformulation Strategies in Web Search Logs," CIKM'09, Nov. 2-6, 2009, 77-86, 10 pages.

(56) References Cited

OTHER PUBLICATIONS

"The Direct Hit Popularity Engine Technology, A White Paper," [online]; Retrieved from the Internet URL: http://www.uni-koblenz.de/FB4/Institues/ICV/AGKrause/Teachings/SS07/DirectHit.pdf, Apr. 2, 2009, 5 pages.

Office Action issued in U.S. Appl. No. 13/342,604 on Jan. 29, 2015, 32 pages.
Office Action issued in U.S. Appl. No. 13/727,968 on Jan. 8, 2015, 23 pages.
Office Action issued in U.S. Appl. No. 13/651,688 on Mar. 25, 2015, 52 pages.

* cited by examiner

CLICK OR SKIP EVALUATION OF PROXIMITY RULES

CROSS-REFERENCE TO RELATED APPLICATION

This application claims the benefit of U.S. Patent Application No. 61/709,726 filed Oct. 4, 2012, the contents of which are incorporated herein by reference.

BACKGROUND

This specification generally relates to search engines, and one particular implementation relates to evaluating query term proximity rules that are used in scoring search results.

SUMMARY

According to an innovative aspect of the subject matter described in this specification, a search engine (or a scoring engine that is affiliated with a search engine) can use query term proximity scoring rules to score search results. Using a query term proximity scoring rule, a search engine or other engine examines the proximity of the query terms as they appear in each search result document referenced by the search results. The query term proximity scoring rule scores a search result document, and thus, its corresponding search result, based upon the proximity of a particular term in the search query and other query terms in the search query as the terms appear in the search result document.

When a user selects a particular search result, the query term proximity scoring rules that apply to the particular search result are evaluated to determine whether they should be applied to future search results. For instance, the search engine may determine that a query term proximity scoring rule that requires a particular query term to be near another query term should not be applied to future search queries if, in the aggregate, users often select search results in which the particular query term and the other query term occur far from each other in text associated with the selected search result. By contrast, the search engine may determine that a query term proximity scoring rule should be applied if, in the aggregate, users often skip search results in which the particular query term and the other query term occur far from each other in text associated with the skipped search result.

If a user selects a search result whose search result document contains a particular query term that is separated a particular number of words from the other query terms, then a click count for the proximity scoring rule pertaining to the particular query term is incremented. If a user skips over a search result whose search result document contains the particular query term that is separated a particular number of words from the other query terms, then a skip count for the proximity scoring rule pertaining to the particular query term is incremented. The click count and skip count for a particular proximity scoring rule can be used in future search queries to determine the ranking of search results generated from a search query that includes the particular query term.

In general, another innovative aspect of the subject matter described in this specification may be embodied in methods that include the actions of evaluating a query term proximity rule based on determining whether a user has (i) selected a search result that includes a particular query term that is separated a particular distance from all other query terms (referred to as a "click evaluation" of the proximity rule), or (ii) selected a search result that ranks below a search result that includes a particular query term that is separated a particular distance from all other query terms (referred to as a "skip evaluation" of the proximity rule). In either instance, the proximity engine may infer, through a user's clicking on or skipping a particular search result, that the occurrence of the separated query terms in the particular search result played some part in the user's decision to select or not select the particular search result. This insight may be used to measure the quality of the proximity rule.

In general, another innovative aspect of the subject matter described in this specification may be embodied in methods that include the actions of accessing query data that identifies, for a search query, a particular query term and one or more other query terms that are included in the search query, search results that were generated using the search query, and a particular search result selected by a user. The actions further include determining, using the query data, that, (i) in text associated with the particular search result, the particular query term is separated from all of the one or more other query terms by at least a predetermined minimum number of terms, and (ii) in text associated with a search result that was ranked higher than the particular search result, the particular query term is not separated from all of the one or more other query terms by at least the predetermined minimum number of terms, then incrementing a click count for a query term proximity rule corresponding to the particular query term.

These and other embodiments can each optionally include one or more of the following features. A score is assigned to the query term proximity rule based on the click count, a skip count, and a fake skip count. The score is based on a ratio of (i) the click count to (ii) the click count, the skip count, and the fake skip count. The actions further include determining that the score for the query term proximity rule does not meet a threshold, and removing the query term proximity rule from a set of query term proximity rules used to generate revised search queries based on determining that the score does not meet the threshold. A first weight is associated with the click count, a second weight with the skip count, and a third weight associated with the fake skip count. The score satisfies Equation (1), below:

$$\frac{(\text{click\_count} * W1)}{(\text{click\_count} * W1) + (\text{skip\_count} * W2) + (\text{fake\_skip\_count} * W3)} \qquad (1)$$

In Equation (1), W1 represents the first weight associated with the click count, W2 represents the second weight associated with the skip count, and W3 represents the third weight associated with the fake skip count. The query term proximity rule includes a query term revision rule for revising search queries by separating the particular query term and the one or more other query terms the particular number of words. The query term proximity rule includes a query term scoring rule for scoring separation of the particular query term and the one or more other query terms that occur in the in resources that are identified in response to search queries.

In general, another innovative aspect of the subject matter described in this specification may be embodied in methods that include the actions of accessing query data that identifies, for a search query, a particular query term and one or more other query terms that are included in the search query, search results that were generated using the search query, and a particular search result selected by a user. The actions further include determining, using the query data, that, (i) in text associated with the particular search result, the particular query term is not separated from all of the one or more other query terms by at least a predetermined minimum number of terms, and (ii) in text associated with a search result that is ranked higher than the particular search result, the particular query term is separated from all of the one or more other query terms by at least the predetermined minimum number of terms, then incrementing a skip count for a query term proximity rule corresponding to the particular query term.

These and other embodiments can each optionally include one or more of the following features. A score is assigned to the query term proximity rule based on a click count, the skip count, and a fake skip count. The score is based on a ratio of (i) the click count to (ii) the click count, the skip count, and the fake skip count. The actions further include determining that the score for the query term proximity rule does not meet a threshold, and removing the query term proximity rule from a set of query term proximity rules used to generate revised search queries based on determining that the score does not meet the threshold. A first weight is associated with the click count, a second weight with the skip count, and a third weight associated with the fake skip count. The score satisfies Equation (2), below:

$$\frac{(click\_count * W1)}{(click\_count * W1) + (skip\_count * W2) + (fake\_skip\_count * W3)} \qquad (2)$$

In Equation (2), W1 represents the first weight associated with the click count, W2 represents the second weight associated with the skip count, and W3 represents the third weight associated with the fake skip count. The query term proximity rule includes a query term revision rule for revising search queries by separating the particular query term and the one or more other query terms the particular number of words. The query term proximity rule includes a query term scoring rule for scoring separation of the particular query term and the one or more other query terms that occur in the in resources that are identified in response to search queries.

In general, another innovative aspect of the subject matter described in this specification may be embodied in methods that include the actions of accessing query data that identifies, for a search query, a particular query term and one or more other query terms that are included in the search query, search results that were generated using the search query, and a particular search result selected by a user. The actions further include determining, using the query data, that, (i) in text associated with the particular search result, the particular query term is separated from all of the one or more other query terms by at least a predetermined minimum number of terms, and (ii) in text associated with a search result that is ranked higher than the particular search result, the particular query term is separated from all of the one or more other query terms by at least the predetermined minimum number of terms, then incrementing a fake skip count for a query term proximity rule corresponding to the particular query term.

These and other embodiments can each optionally include one or more of the following features. A score is assigned to the query term proximity rule based on a click count, a skip count, and the fake skip count. The score is based on a ratio of (i) the click count to (ii) the click count, the skip count, and the fake skip count. The actions further include determining that the score for the query term proximity rule does not meet a threshold, and removing the query term proximity rule from a set of query term proximity rules used to generate revised search queries based on determining that the score does not meet the threshold. A first weight is associated with the click count, a second weight with the skip count, and a third weight associated with the fake skip count. The score satisfies Equation (3), below:

$$\frac{(click\_count * W1)}{(click\_count * W1) + (skip\_count * W2) + (fake\_skip\_count * W3)} \qquad (3)$$

In Equation (3), W1 represents the first weight associated with the click count, W2 represents the second weight associated with the skip count, and W3 represents the third weight associated with the fake skip count. The query term proximity rule includes a query term revision rule for revising search queries by separating the particular query term and the one or more other query terms the particular number of words. The query term proximity rule includes a query term scoring rule for scoring separation of the particular query term and the one or more other query terms that occur in the in resources that are identified in response to search queries.

In general, another innovative aspect of the subject matter described in this specification may be embodied in methods that include the actions of accessing query data that identifies, for a search query, a particular query term and one or more other query terms that are included in the search query, search results that were generated using the search query, and a particular search result selected by a user. The actions further include determining, using the query data, that, (i) in text associated with the particular search result, the particular query term is separated from the other query term by at least a predetermined minimum number of terms, and (ii) in text associated with a search result that is ranked higher than the particular search result, the particular query term is not separated from the other query term by at least the predetermined minimum number of terms, then incrementing a click count for a query term proximity rule corresponding to the particular query term in context with other query term.

These and other embodiments can each optionally include one or more of the following features. A score is assigned to the query term proximity rule based on the click count, a skip count, and a fake skip count. The score is based on a ratio of (i) the click count to (ii) the click count, the skip count, and the fake skip count. The actions further include determining that the score for the query term proximity rule does not meet a threshold, and removing the query term proximity rule from a set of query term proximity rules used to generate revised search queries based on determining that the score does not meet the threshold. A first weight is associated with the click count, a second weight with the skip count, and a third weight associated with the fake skip count. The score satisfies Equation (4), below:

$$\frac{(click\_count * W1)}{(click\_count * W1) + (skip\_count * W2) + (fake\_skip\_count * W3)} \qquad (4)$$

In Equation (4), W1 represents the first weight associated with the click count, W2 represents the second weight associated with the skip count, and W3 represents the third weight associated with the fake skip count. The query term proximity rule includes a query term revision rule for revising search queries by separating the particular query term and the one or more other query terms the particular number of words. The query term proximity rule includes a query term scoring rule for scoring separation of the particular query term and the one or more other query terms that occur in the in resources that are identified in response to search queries.

In general, another innovative aspect of the subject matter described in this specification may be embodied in methods that include the actions of accessing query data that identifies, for a search query, a particular query term and one or more other query terms that are included in the search query, search results that were generated using the search query, and a particular search result selected by a user. The actions further include determining, using the query data, that, (i) in text associated with the particular search result, the particular query term is not separated from the other query term by at least a predetermined minimum number of terms, and (ii) in text associated with a search result that is ranked higher than the particular search result, the particular query term is separated from the other query term by at least the predetermined minimum number of terms, then incrementing a skip count for a query term proximity rule corresponding to the particular query term in context with other query term.

These and other embodiments can each optionally include one or more of the following features. A score is assigned to the query term proximity rule based on a click count, the skip count, and a fake skip count. The score is based on a ratio of (i) the click count to (ii) the click count, the skip count, and the fake skip count. The actions further include determining that the score for the query term proximity rule does not meet a threshold, and removing the query term proximity rule from a set of query term proximity rules used to generate revised search queries based on determining that the score does not meet the threshold. A first weight is associated with the click count, a second weight with the skip count, and a third weight associated with the fake skip count. The score satisfies Equation (5), below:

$$\frac{(\text{click\_count} * W1)}{(\text{click\_count} * W1) + (\text{skip\_count} * W2) + (\text{fake\_skip\_count} * W3)} \quad (5)$$

In Equation (5), W1 represents the first weight associated with the click count, W2 represents the second weight associated with the skip count, and W3 represents the third weight associated with the fake skip count. The query term proximity rule includes a query term revision rule for revising search queries by separating the particular query term and the one or more other query terms the particular number of words. The query term proximity rule includes a query term scoring rule for scoring separation of the particular query term and the one or more other query terms that occur in the in resources that are identified in response to search queries.

In general, another innovative aspect of the subject matter described in this specification may be embodied in methods that include the actions of accessing query data that identifies, for a search query, a particular query term and one or more other query terms that are included in the search query, search results that were generated using the search query, and a particular search result selected by a user. The actions further include determining, using the query data, that, (i) in text associated with the particular search result, the particular query term is separated from the other query term by at least a predetermined minimum number of terms, and (ii) in text associated with a search result that is ranked higher than the particular search result, the particular query term is separated from the other query term by at least the predetermined minimum number of terms, incrementing a fake skip count for a query term proximity rule corresponding to the particular query term in context with the other query term.

These and other embodiments can each optionally include one or more of the following features. A score is assigned to the query term proximity rule based on a click count, a skip count, and the fake skip count. The score is based on a ratio of (i) the click count to (ii) the click count, the skip count, and the fake skip count. The actions further include determining that the score for the query term proximity rule does not meet a threshold, and removing the query term proximity rule from a set of query term proximity rules used to generate revised search queries based on determining that the score does not meet the threshold. A first weight is associated with the click count, a second weight with the skip count, and a third weight associated with the fake skip count. The score satisfies Equation (6), below:

$$\frac{(\text{click\_count} * W1)}{(\text{click\_count} * W1) + (\text{skip\_count} * W2) + (\text{fake\_skip\_count} * W3)} \quad (6)$$

In Equation (6), W1 represents the first weight associated with the click count, W2 represents the second weight associated with the skip count, and W3 represents the third weight associated with the fake skip count. The query term proximity rule includes a query term revision rule for revising search queries by separating the particular query term and the one or more other query terms the particular number of words. The query term proximity rule includes a query term scoring rule for scoring separation of the particular query term and the one or more other query terms that occur in the in resources that are identified in response to search queries.

Other embodiments of this aspect include corresponding systems, apparatus, and computer programs recorded on computer storage devices, each configured to perform the operations of the methods.

Particular embodiments of the subject matter described in this specification can be implemented so as to realize one or more of the following advantages. Click and skip evaluation of proximity rules can identify proximity rules that should be removed from a search system. Click and skip evaluation can also improve the quality of retrieved search results by helping to eliminate search results that users found unhelpful. Click and skip evaluation of proximity rules can also demote (instead of removing completely) proximity rules, allowing low-confidence rules to be used less frequently in retrieving search results.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
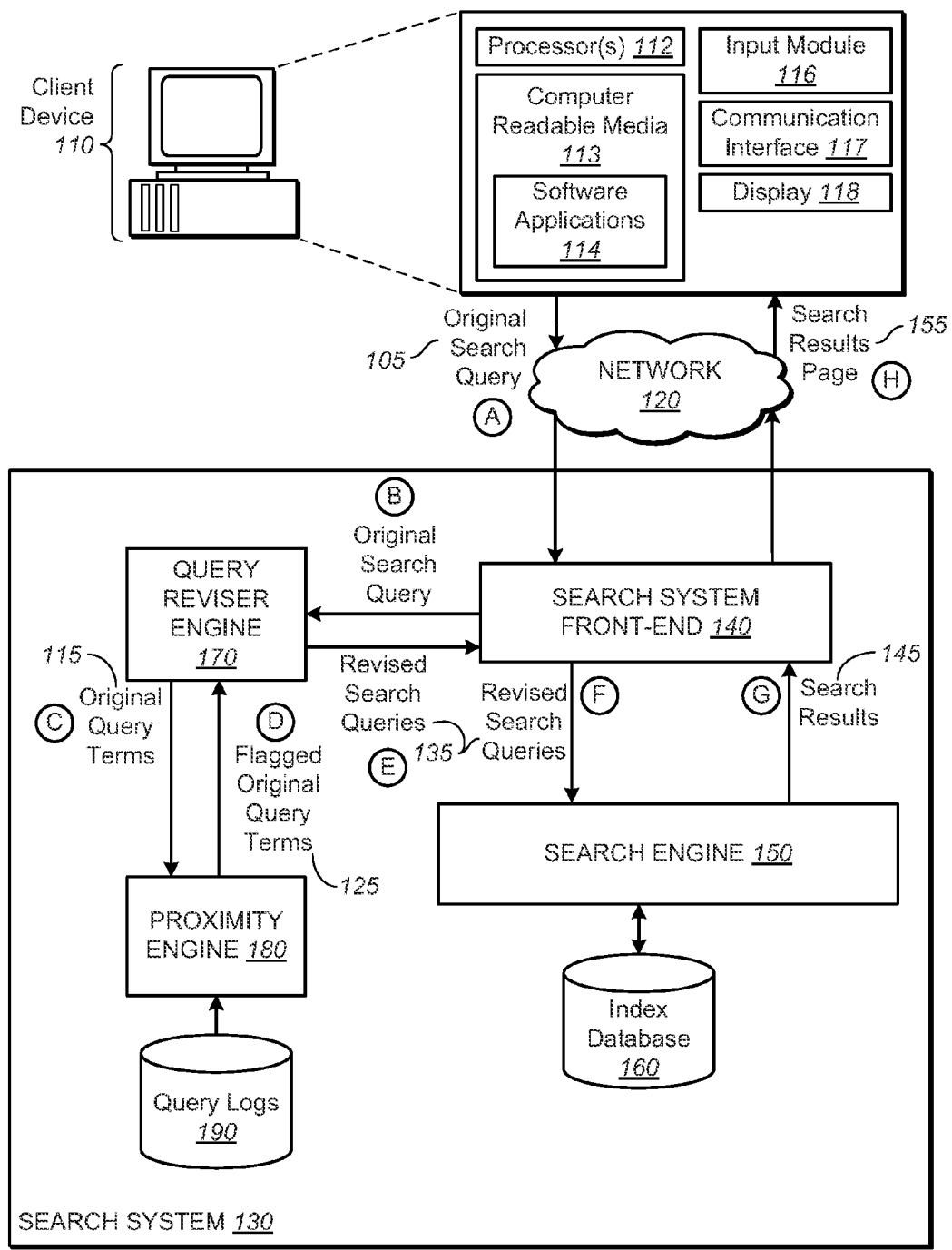
FIG. 1 is a diagram of an example system that uses proximity to generate search results.

FIG. 1 is a diagram of an example system 100 that uses proximity rules to score search results. In general, the system 100 includes a client device 110 coupled to a search system 130 over a network 120. The search system 130 receives an original search query 105 from the client device 110 over network 120, and the search system 130 provides a search results page 155 that presents search results 145 identified as being responsive to the query 105 to the client device 110 over the network 120.

The search results 145 identified by the search system 130 can include one or more search results that were identified as being responsive to queries that are different than the original search query 105. The other queries can be obtained or generated in numerous ways, including by revising the original search query 105.

In one example, the search system 130 can optionally generate a revised search query 135 in which terms, whose occurrence in a resource associated with a search result are counted only if they are proximate to one or more other terms, are flagged. In some implementations, a pair of terms are proximate to each other if they are near each other. In other words, the pair of terms is separated by no more than a particular number of words. For example, if the particular number of words is five words, then two terms separated by 3 words would be proximate to each other. The original search query 105 and the revised search queries 135 can be used by a search engine 150 to identify and rank search results. The identified search results 145 can be provided to the client device 110 on a search results page 155.

In generating a revised search query, the search system 130 can optionally flag (or otherwise specially designate) some or all of the original query terms 115 according to various query term proximity rules. For instance, given the original query terms 115 "white house president," the search system 130 can generate a revised search query that requires the terms "white" or "white house" to occur in proximity with one or more other query terms in resources associated with search results, in order for occurrences of those terms in the resources to be counted when scoring the search results.

The search system 130 can be implemented as, for example, computer programs running on one or more computers in one or more locations that are coupled to each other through a network. The search system 130 includes a search system front end 140 (or a "gateway server") to coordinate requests between other parts of the search system 130 and the client device 110. The search system 130 also includes a search engine 150, a query reviser engine 170, and a proximity engine 180.

As used by this specification, an "engine" (or "software engine") refers to a software implemented input/output system that provides an output that is different than the input. An engine may be an encoded block of functionality, such as a library, a platform, Software Development Kit ("SDK"), or an object. The network 120 may include, for example, a wireless cellular network, a wireless local area network (WLAN) or Wi-Fi network, a Third Generation (3G) or Fourth Generation (4G) mobile telecommunications network, a wired Ethernet network, a private network such as an intranet, a public network such as the Internet, or any appropriate combination thereof.

The search system front-end 140, search engine 150, query reviser engine 170, and proximity engine 180 can be implemented on any appropriate type of computing device (e.g., servers, mobile phones, tablet computers, music players, e-book readers, laptop or desktop computers, PDAs, smart phones, or other stationary or portable devices) that includes one or more processors and computer readable media. Among other components, the client device 110 includes one or more processors 112, computer readable media 113 that store software applications 114 (e.g. a browser layout engine), an input module 116 (e.g., a keyboard or mouse), communication interface 117, and a display 118. The computing device or devices that implement the search system front-end 140, the query reviser engine 170, and the search engine 150 may include similar or different components.

In general, the search system front-end 140 receives the original search query 105 from client device 110, and routes the original search query 105 to the appropriate engines so that the search engine results page 155 may be generated. In some implementations, routing occurs by referencing static routing tables, or routing may occur based on the current network load of an engine, so as to accomplish a load balancing function. The search system front-end 140 also provides the resulting search engine results page 155 to the client device 110. In doing so, the search system front-end 140 acts as a gateway, or interface, between the client device 110 and the search engine 150. In some implementations, the search system 130 contains many thousands of computing devices to execute for the queries that are processed by the search system 130.

Two or more of the search system front-end 140, the query reviser engine 170, and the search engine 150 may be implemented on the same computing device, or on different computing devices. Because the search engine results page 155 is generated based on the collective activity of the search system front-end 140, the query reviser engine 170, and the search engine 150, the user of the client device 110 may refer to these engines collectively as a "search engine." This specification, however, refers to the search engine 150, and not the collection of engines, as the "search engine," since the search engine 150 identifies the search results 145 in response to the user-submitted search query 105.

In FIG. 1, a user of the client device 110 enters query terms 115 for the original search query 105 during stage (A), and the client device 110 communicates the original search query 105 to the search system 130 over the network 120. The user may submit the original search query 105 by initiating a search dialogue on the client device 110, by speaking or typing the terms 115 of the original search query 110, then by pressing a search initiation button or control on the client device 110. The client device 110 formulates the original search query 105, e.g., by specifying search parameters, and transmits the original search query 105 over the network 120.

Although this specification refers to the query 105 as an "original" or an "initial" query, such reference is merely intended to distinguish this query from other queries, such as the revised queries that are described below. The designation of the original query 105 as "original" is not intended to require the original query 105 to be the first query that is entered by the user, or to be a query that is manually entered. For example, the original query 105 may be the second or subsequent query entered by the user, or the original query 105 may be automatically derived (e.g., by the query reviser engine 170) or may be modified based upon prior queries entered by the user, location information, and the like.

During stage (B), the search system front-end 140 receives the original search query 105 and communicates the original search query 105 to the query reviser engine 170. The query reviser engine 170 can generate one or more revised search queries 135 based on the original search query 105. In some implementations, the query reviser engine 170 generates a revised search query 135 by flagging terms whose occurrence in a resource associated with a search result are counted only if they are proximate to one or more other terms, are flagged.

The query reviser engine 170 can determine which terms of the original query terms 125 to flag when revising the original search query 105 through information provided by the proximity engine 180. Specifically, during stage (C), the query reviser engine 170 communicates original query terms 115 of the original search query 105 to the proximity engine 180. The proximity engine 180 optionally uses proximity rules 190 to flag original query terms 125 for the original query terms 115 of the original search query 105.

The search system 130 can define a proximity rule for a search query, and can use the proximity rule at a later time to flag original query terms 125 when generating revised search queries for search queries. For example, for the search query "white house president," the search system 130 can identify a proximity rule that indicates that "white" should be flagged as a query term whose occurrence in a resource associated with the search result is counted only if they are proximate to one or more other query terms or a proximity rule that indicates that "white" and "president" should be flagged as query terms, whose occurrence in a resource associated with a search result are counted only if they are proximate to one or more other terms, are flagged. The search system 130 can generate a revised search query to include the flagged original query terms 125.

Proximity rules can be defined to apply generally, or can be defined to apply only when particular query contexts are satisfied. The query context of a proximity rule can specify, for example, that a particular query term should appear within a particular number of words from another particular query term. Furthermore, query contexts can specify relative location and distance for the other terms, e.g. to the right or left a particular number of words of a query term under evaluation. For example, a proximity rule can specify that in a search query with "house" and "president" that "house" should be on the left of "president" and be within five words. A proximity rule in the general context can specify, for example, that a particular query term should appear within a particular number of words from any other query term. For example, a proximity rule can specify that in a search query with "house" and any other query term that "house" should be within five words from any other query term. The proximity rules can be stored for use by, e.g., the proximity engine 180, the query reviser engine 170, or the search engine 150.

The proximity engine 180 communicates flagged original query terms 125 to the query reviser engine 170 during stage (D). The query reviser engine 170 generates one or more revised search queries 135 by, for example, including the flagged original query terms 125 in a revised search query 135.

The query reviser engine 170 communicates the one or more revised search queries 135 to the search system front-end 140 during stage (E). The search system front-end 140 communicates the original search query 105 and/or the one or more revised search queries 135 generated by the proximity rule to the search engine 150 during stage (F). The search engine 150 generates search results 145 that it identifies as being responsive to the original search query 105 and/or the one or more revised search queries 135 generated by the proximity rule.

In some implementations, the search engine 150 generates search results 145 that it identifies as being responsive to the one or more revised search queries 135 instead of the original search query 105. In other implementations, the search engine generates search results 145 that it identifies as being responsive to the original search query 105 and the one or more revised search queries 135 where the search results 145 identified as responsive to the original search 105 are weighted less than the search results 145 identified as responsive to the one or more revised search queries 135. The search engine 150 can identify search results 145 for each search query using an index database 160 that stores indexed resources (e.g., web pages, images, or news articles on the Internet).

The search engine 150 may generate a score for each search result based in part on the proximity rules that specify how occurrences of particular terms that occur in the resource identified by the search result are to be counted during stage (G). The search engine 150 can combine and rank the identified search results 145 using the score and communicate the search results 145 to the search system front-end 140.

Using previous click counts and skip counts associated with an example proximity rule, the search engine 150 can determine if the example proximity rule should apply. The example proximity rule may result in flagging a particular query term that should be within at least a particular number of words from all other query terms. Another example proximity rule may have resulted in flagging two or more particular query terms that should be within a particular number of words from each other and may score that resource higher or lower depending on previous clicks and skips associated with that proximity rule. If multiple proximity rules apply to a particular resource, then the score assigned to the resource based on each particular proximity rule can be weighted to determine an overall score used in raking the resource.

The search system front-end 140 generates a search results page 155 that identifies the highest ranked search results 145 based on the score for each search result. Each of the search results 145 can include, for example, titles, text snippets, images, links, reviews, or other information. The original query terms 115 or the flagged original query terms 125 that appear in the search results 145 can be formatted in a particular way, for example, in bold print. The search system front-end 140 transmits code (e.g., HyperText Markup Language code or eXtensible Markup Language code) for the search results page 155 to the client device 110 over the network 120 at stage (H), so that the client device 110 can display the search results page 155.

The client device 110 invokes the transmitted code, e.g., using a layout engine, and displays the search results page 155 on the display 118. The terms 115 of the original query 105 are displayed in a query box (or "search box"), located for example, on the top of the search results page 155, and some of the search results 145 are displayed in a search results block, for example, on the left-hand side of the search results page 155.

Figure 2:
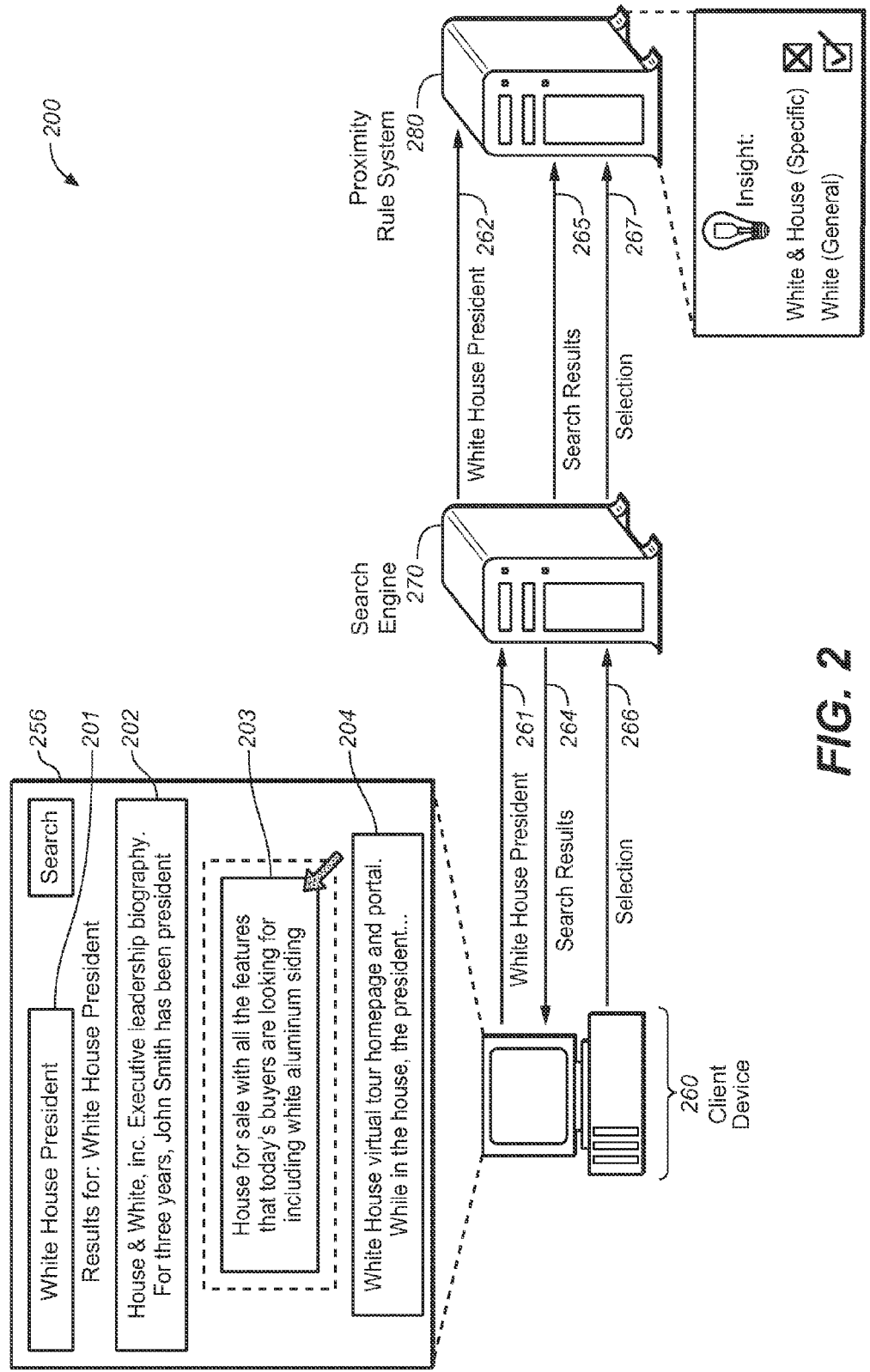
FIG. 2 is a diagram of an example system that evaluates proximity rules.

FIG. 2 is a diagram of an example system 200 that evaluates query term proximity rules. The system 200 includes a client device 260, a search engine system 270, and a query term proximity rule system 280. The components illustrated in FIG. 2 can, for example, be implemented as part of the system illustrated in FIG. 1. In general, the search engine system 270 receives a search query 261 from the client device 260 and provides search results 264 on a search results page 256 in response to the search query 261. In addition to the search results 264, the search results page 256 can also identify the query terms 201 of the search query 261.

Upon receiving the search query 261, the search engine system 270 can send a query message 262 that includes query terms 201 of the search query 261 to the query term proximity rule system 280. The search engine system 270 can also send a search results message 265 to the query term proximity rule system 280. The search results message 265 identifies the search results 264 of the search query 261, or identifies the resources referenced by the search results 264.

The query terms 201 of the original search query 261, "white house president" may occur in the resources referenced by search results 264, with any number of words between the query terms 201, i.e., "House & White, Inc. Executive Leadership Biography. For three years, John Smith has been President," "House for sale with all the features that today's buyers are looking for including white aluminum siding," or "White House virtual tour home page and portal. While in the house, the President . . ." For example, the search result 202 includes the terms "white" and "president" separated by eleven words, the terms "white" and "house" separated by one word, and the terms "house" and "president" separated by thirteen words. The search result 203 includes the terms "white" and "house" separated by thirteen words. The search result 204 includes the terms "white" and "house" separated by both zero words and ten words, the terms "white" and "president" separated by twelve words, and "house" and "president" separated by one and eleven words.

Data that reflects user interactions with the search results 264 can be logged and analyzed in order to gain insights that the proximity rule system 280 may use to evaluate particular query term proximity rules. For example, a user selection 266 of a particular search result on search results page 256 can be received by the search engine system 270 and provided as a selection message 267 to the proximity rule system 280.

The proximity rule system 280 may in turn evaluate particular query term proximity rules that are used to revise other search queries, or to score occurrences of query terms that occur in resources identified by other search queries. For instance, using click evaluation, the proximity rule system 280 may infer that the occurrence of two query terms separated by a pre-determined number of words may have resulted in a particular search result being selected as part of a set of search results, or may have driven the user's decision to select a particular search result. Similarly, the proximity system 280 may, through skip evaluation, infer that the occurrence of two query terms separated by a pre-determined number of words may have driven the user's decision to skip a particular search result that is ranked higher than the search result that the user selected.

For example, the search engine 270 identifies search results 202, 203, and 204 in response to the search query 261, which includes the phrase "white house president." If users generally tend to select search results that include "white" separated from other query terms by at least five words, such as by selecting search result 203, the proximity rule system 280 can gain the insight that that "white" separated by at least five words from other query terms is associated with high quality search results for the original query term "white."

Accordingly, a query revision rule will not be invoked to flag future search queries that include the query term "white" as a term whose occurrence in a resource associated with a search result is counted only if it is proximate to one or more other terms is flagged. A query term scoring rule may be implemented to score occurrences of "white" separated by at least a particular number of words from other query terms higher than occurrences of "white" that are within a particular number of words from other query terms. One such rule, for example, is a proximity rule that flags "white" as a query term whose occurrence in a resource associated with a search result is counted only if it is proximate to one or more other terms is flagged.

Conversely, if users tend to skip over search results that include the query term "house" separated from another query term "president" by a particular number of words, such as selecting search result 203, the proximity rule system 280 can gain insight that the query term "house" separated from the other query term "president" a particular number of words is associated with lower quality search results for search queries that include "house" and "president." One such rule, for example, is a proximity rule that flags "house" and "president" as terms whose occurrence in a resource associated with a search result are counted only if they are proximate to one or more other terms are flagged. Accordingly, a query term scoring rule may be implemented to assign a higher score to occurrences of "house" and "president" when they occur within a particular threshold number of words from each other.

To evaluate proximity rules based on user interaction with provided search results, various metrics can be computed and combined into a score for each proximity rule. A separate score can be computed for each proximity rule, in a general context or in particular contexts.

One metric that can be used to evaluate proximity rules is a click count. In some implementations, a "click" occurs when (i) a user selects a search result whose referenced document includes a particular query term separated by a predetermined number of words from all other query terms and (ii) there is not a higher ranked search result whose referenced document includes the particular query term separated by a predetermined number of words from all other query terms. In other implementations, a "click" occurs when the search result itself, and not the referenced document, includes a particular query term separated by a predetermined number of words from all other query terms. In some implementations, tabs, page breaks, line feeds, carriage returns, punctuation marks, or other characters are counted to determine separation of query terms. Although the selection of a search result is referred to by this specification as a "click," the selection can also be a voice-based selection, or a selection by a user's finger on a presence-sensitive input mechanism, e.g., a touch-screen device, or any other appropriate selection mechanism.

When a referenced document of a search result contains both (i) the particular query term and another query term separated by the predetermined number of words and (ii) the particular query term and the other query term or any other query term not separated by the predetermined number of words, then the smallest separation between the particular query term and the other query term or any other query term is used to determine the proximity between the particular query term and the other query terms.

Another metric that can be used to evaluate proximity rules is a skip count. In some implementations, a "skip" occurs when (i) a user selects a search result whose referenced document does not include a particular query term separated by a predetermined number of words from all other query terms and (ii) a higher ranked search result referenced document does include the particular query term separated by a predetermined number of words from all other query terms. In other implementations, a "skip" occurs when (i) the search result itself, and not the referenced document, does not include a particular query term separated by a predetermined number of words from all other query terms and (ii) a higher ranked search result itself, and not the referenced document, does include the particular query term separated by a predetermined number of words from all other query terms. Although the selection of a search result is referred to by this specification as a "skip," the selection can also be a voice-based selection, or a selection by a user's finger on a presence-sensitive input mechanism, e.g., a touch-screen device, or any other appropriate selection mechanism.

Other types of skips, including fake skips, are informative for use in evaluating proximity rules. In general, a fake skip occurs when (i) a user selects a search result whose referenced document includes a particular query term separated by a predetermined number of words from all other query terms and (ii) a higher ranked search result referenced document includes the particular query term separated by a predetermined number of words from all other query terms. In other implementations, a "fake skip" occurs when the search result itself, and not the referenced document, satisfied these criteria.

Proximity rules can also apply in a specific context where clicks, skips, and fake skips are calculated for a proximity rule in a specific context. In some implementations, a "click" occurs when (i) a user selects a search result whose referenced document includes a particular query term separated by a predetermined number of words from a particular other query term and (ii) a higher ranked search result whose referenced document does not include the particular query term separated by a predetermined number of words from the particular other query term. In other implementations, a "click" occurs when the search result itself, and not the referenced document, includes a particular query term separated by a predetermined number of words from the particular other query term.

Another metric that can be used to evaluate proximity rules in a specific context is a skip count. In some implementations, a "skip" occurs when (i) a user selects a search result whose referenced document does not include a particular query term separated by a predetermined number of words from a particular other query term and (ii) a higher ranked search result referenced document does include a particular query term separated by a predetermined number of words from the particular other query term. In other implementations, a "skip" occurs when (i) the search result itself, and not the referenced document, does not include a particular query term separated by a predetermined number of words from a particular other query term and (ii) a higher ranked search result itself, and not the referenced document, does include a particular query term separated by a predetermined number of words the particular other query term.

Other types of skips, including fake skips, are informative for evaluating proximity rules in a specific context. In general, a fake skip occurs when (i) a user selects a search result whose referenced document includes a particular query term separated by a predetermined number of words from a particular other query term and (ii) a higher ranked search result whose referenced document includes the particular query term separated by a predetermined number of words from the particular other query term. In other implementations, a "fake skip" occurs when the search result itself, and not the referenced document, satisfied these criteria.

The proximity rule system 280 can aggregate counts of clicks, skips, and fake skips into a score that may be used to evaluate a particular proximity rule. In some implementations, the proximity rule system 280 can remove a proximity rule whose corresponding score is above a threshold.

For example, the proximity rule system 280 can assign a respective weight (e.g. 7, 3, 5) to a click count, a skip count, and a fake skip count. In some implementations, the weights are empirically determined. The proximity system 280 can then compute a weighted ratio using a combination of counts recorded for a particular proximity rule as shown below in Equation (7), using example weights A, B, and C:

$$\text{score} = \frac{(\text{click\_count} * A)}{(\text{click\_count} * A) + (\text{skip\_count} * B) + (\text{fake\_skip\_count} * C)} \quad (7)$$

Figure 3A:
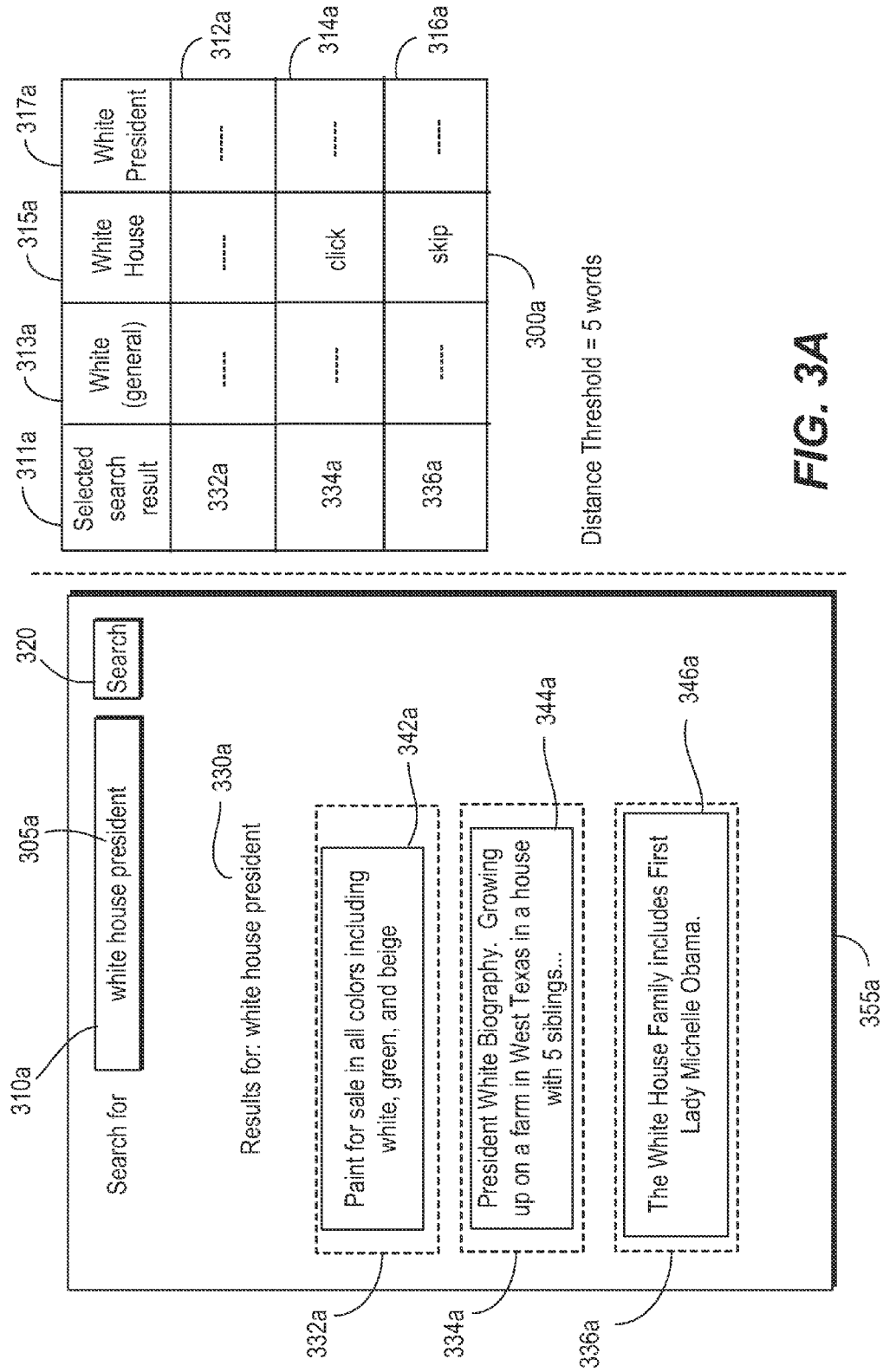
FIGS. 3A to 3E illustrate example search results pages and tables that show the example result of evaluating proximity rules using click and skip evaluation.

FIGS. 3A-3E illustrate example search results pages and tables showing proximity rule application. FIG. 3A illustrates an example search results page 355a and a table 300a that shows the example result of evaluating proximity rules using click and skip evaluation. The search results page 355a presents a ranked list of search results in response to a query 305a ("white house president") entered into a search box 310. The search results page can include a control element 320 (e.g. a button) for initiating a search. Each search result 332a, 334a, and 336a includes search result text (e.g. "Paint for sale in all colors including white, green, and beige" 342a).

A user's selection of a particular search result can be evaluated using click or skip evaluation, resulting in a click or a skip being counted for particular proximity rules associated with the particular search result. The search results page 355a can be provided by a search system, for example, search system 130 as shown in FIG. 1. In addition, a search system (for example, search system 130) can receive user selections of search results on the search results page 355a and evaluate proximity rules based on the user selections.

In the example illustrated, the three-term query "white house president" is used to retrieve search results 332a, 334a, and 336a. The resulting click or skip count is illustrated in table 300a for each of the search results 332a, 334a, and 336a. Row 312a of table 300a illustrates the click or skip counts if search result 332a is selected. Row 314a illustrates the click or skip counts if search result 334a is selected. Row 316a illustrates the click or skip counts if search result 336a is selected. Column 311a of table 300a illustrates which of the search results 332a, 334a, or 336a is selected. Column 313a illustrates click or skip counts for the query term "white" for the proximity rule in the general context. Column 315a illustrates click or skip counts for the query terms "white" and "house" for the proximity rule in the specific context. Column 317a illustrates click or skip counts for the query terms "white" and "president" for the proximity rule in the specific context. In the example shown in FIG. 3A, only the proximity rules related to "white" are illustrated, although proximity rules other than those shown in table 300a may also be computed from the selection of search results 332a, 334a, and 336a.

In row 312a of table 300a, search result 332a has been selected by a user. Search result text 342a contains the query term "white." Search result text 334a contains no other query terms. Therefore, column 313a, 315a, and 317a illustrate neither "click" or "skip" counts.

In row 314a of table 300a, search result 334a has been selected by a user. Search result text 344a contains the query terms "president," "white," and "house." "White" is within five words of "president." "White" is at least five words from "house." Therefore, column 313a illustrates neither a "click" or "skip" because "white" is within five words of at least one other query term. Column 315a illustrates a "click" because "white" is at least five words from "house" and "white is not at least five words from "house" in a higher ranked search result. Column 317a illustrates neither a "click" or "skip" because "white" is within five words of "president."

In row 316a of table 300a, search result 336a has been selected by a user. Search result text 346a contains the query terms "white" and "house." "White" is within five words of "house." Therefore, column 313a illustrates neither a "click"

or "skip" because "white" is within five words of at least one other query term. Column 315a illustrates a "skip" because a higher ranked search result contains "white" at least five words from "house" and search result text 346a contains "white" within five words of "house." Column 317a illustrates neither a "click" or "skip" because "president" is not in search result text 346a.

Figure 3B:
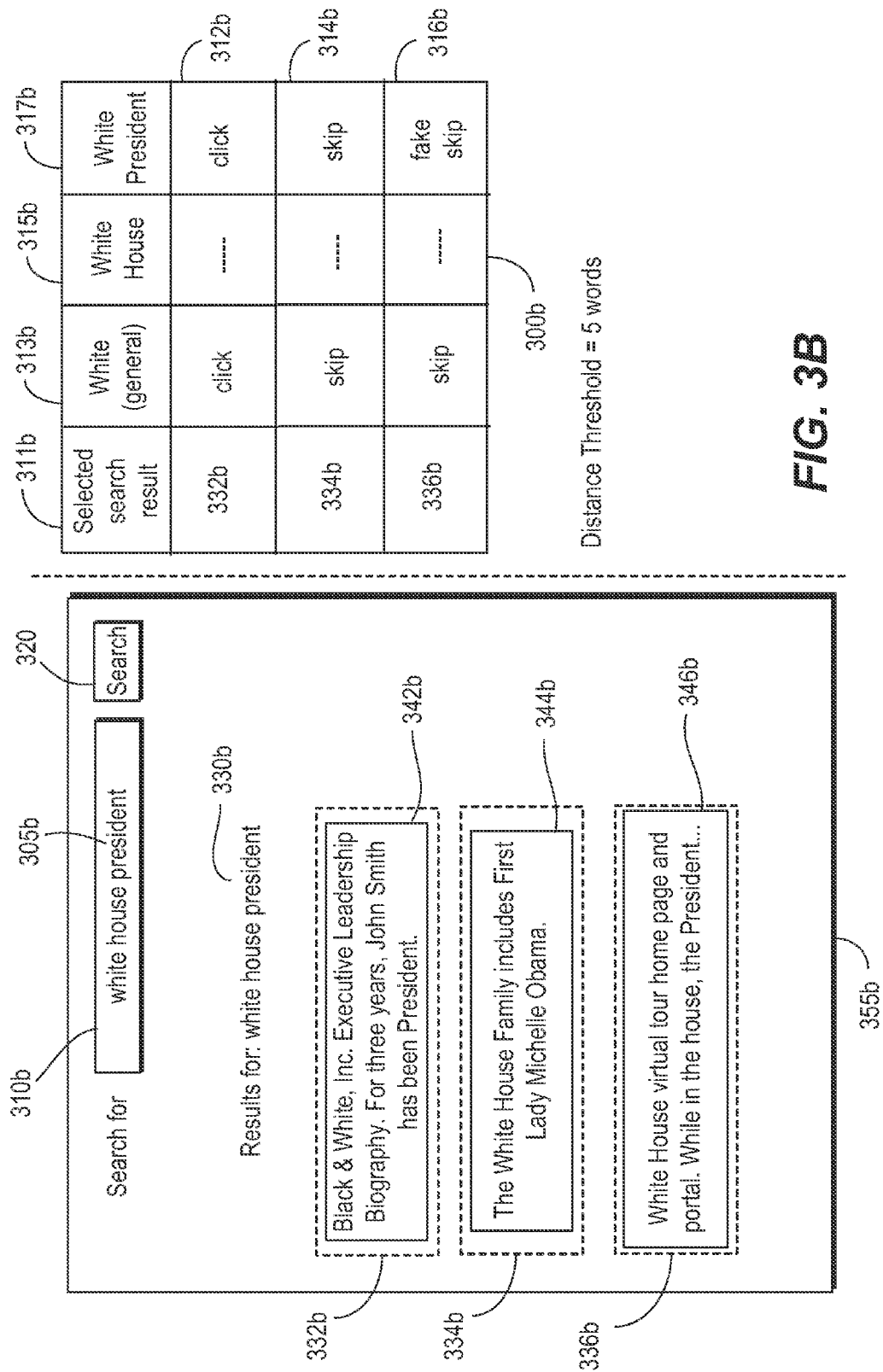

FIG. 3B illustrates an example search results page 355b and a table 300b that shows the example result of evaluating proximity rules using click and skip evaluation. The search results page 355b presents a ranked list of search results in response to a query 305b ("white house president") entered into a search box 310. The search results page can include a control element 320 (e.g. a button) for initiating a search. Each search result 332b, 334b, and 336b includes search result text (e.g. "Black & White, Inc. Executive Leadership Biography. For three years, John Smith has been President." 342a).

In row 312b of table 300b, search result 332b has been selected by a user. Search result text 342b contains the query terms "white" and "president." "House" does not appear. "White" is at least five words from "president." Therefore, column 313b illustrates a "click" because "white" is at least five words from any other query term. Column 315b illustrates neither a "click" nor a "skip" because "house" is not in search result text 342b. Column 317b illustrates a "click" because "white" at least five words from "president."

In row 314b of table 300b, search result 334b has been selected by a user. Search result text 344b contains the query terms "white" and "house." "White" is within five words of "house." "President" does not appear. Therefore, column 313b illustrates a "skip" because "white" at least five words from any other query term in search result text 344b and "white" is at least five words from any other query term in search result text 342b. Column 315b illustrates neither a "click" nor a "skip" because "house" is within five words of "white" and "house" does not appear in search result text 342b. Column 317b illustrates a "skip" because "white" is at least five words from "president" in search result text 342b and "president" does not appear in search result text 344b.

In row 316b of table 300b, search result 336b has been selected by a user. Search result text 346b contains the query terms "white," "house," and "president." "White" is within five words of, and at least five words from, "house" and at least five words of "president." The smallest distance between "white" and "house" is used in click and skip evaluation. Therefore, column 313b illustrates "skip" because "white" is within five words from any other query term in search result text 346b and "white" is at least five words from any other query term in search result text 342b. Column 315b illustrates neither a "click" nor a "skip" because "house" is within five words of "white." Column 317b illustrates a "fake skip" because "white" is at least five words from "president" in search result text 342b and "white" is at least five words from "president" in search result text 346b.

Figure 3C:
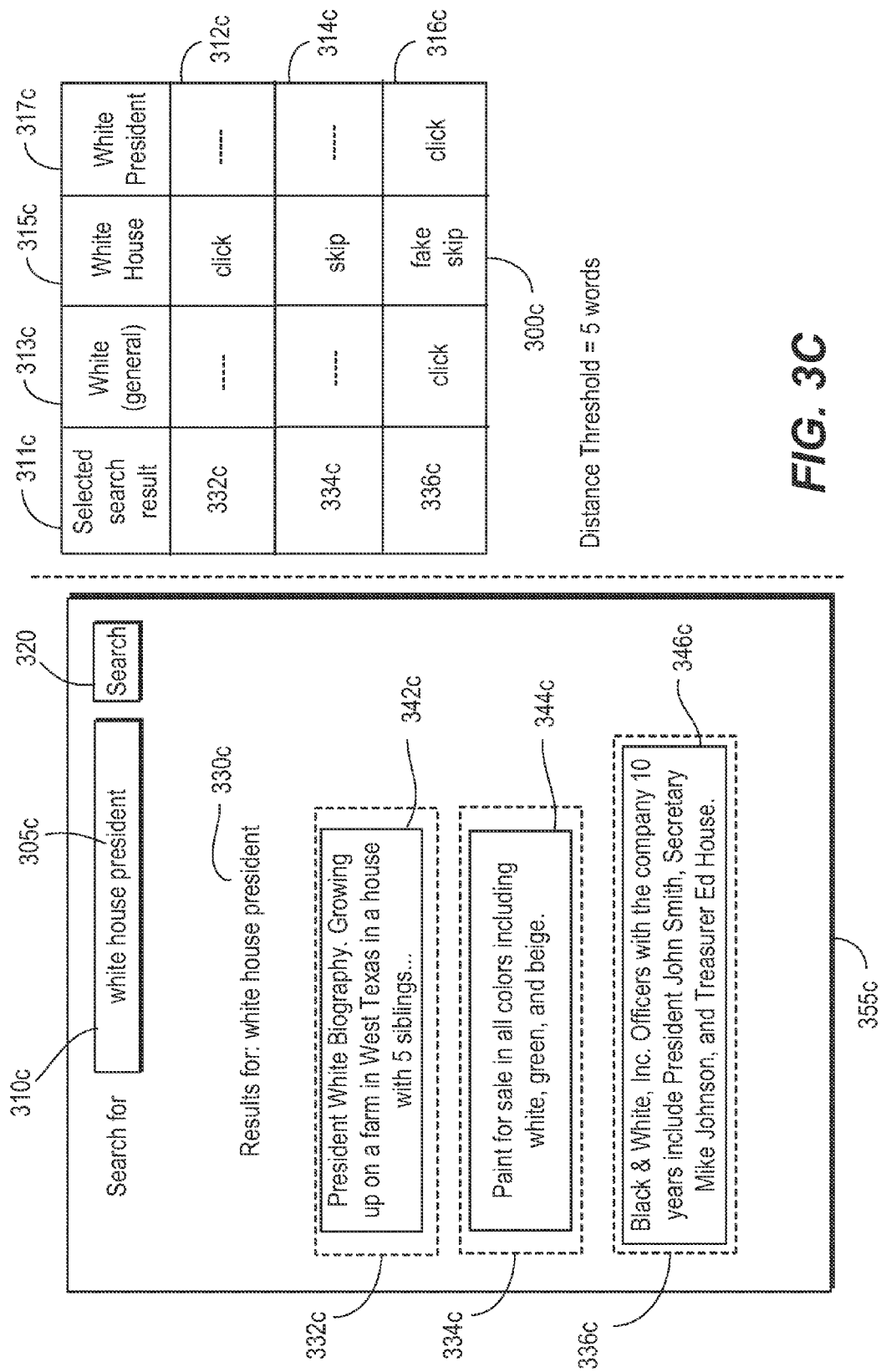

FIG. 3C illustrates an example search results page 355c and a table 300c that shows the example result of evaluating proximity rules using click and skip evaluation. The search results page 355c presents a ranked list of search results in response to a query 305c ("white house president") entered into a search box 310. The search results page can include a control element 320 (e.g. a button) for initiating a search. Each search result 332c, 334c, and 336c includes search result text (e.g. "President White Biography. Growing up on a farm in West Texas in a house with 5 siblings . . . " 342c).

In row 312c of table 300c, search result 332c has been selected by a user. Search result text 342c contains the query terms "white," "house," and "president." "White" is at least five words from "house" and within five words of "president." Therefore, column 313c illustrates neither a "click" nor a "skip" because "white" is within five words of any other query term. Column 315c illustrates a "click" because "white" is at least five words from "house" in search result text 342c. Column 317c illustrates neither a "click" nor a "skip" because "white" is within five words of "president."

In row 314c of table 300c, search result 334b has been selected by a user. Search result text 344c contains the query term "white." "President" and "house" do not appear. Therefore, column 313c illustrates neither a "click" nor a "skip" because "white" is the only query term in the search result text 344c and "white" is within five words from any other query term in a higher ranked search result. Column 315c illustrates a "skip" because "white" is the only query term in the search result text 344c and "white" is at least five words from "house" in the search result text 342c. Column 317c illustrates neither a "click" nor a "skip" because "white" is within five words of "president" in search result text 342c and "president" does not appear in search result text 344c.

In row 316c of table 300c, search result 336c has been selected by a user. Search result text 346c contains the query terms "white," "house," and "president." "White" is at least five words from both "president" and "house." Therefore, column 313c illustrates "click" because "white" is at least five words from any other query term in search result text 346c and "white" is not at least five words from any other query term in search result texts 342c and 344c. Column 315c illustrates a "fake skip" because "house" is at least five words from "white" in both search result texts 342c and 346c. Column 317c illustrates a "click" because "white" is at least five words from "president" in search result text 346b and "white" is not at least five words from "president" in a higher ranked search result text.

Figure 3D:
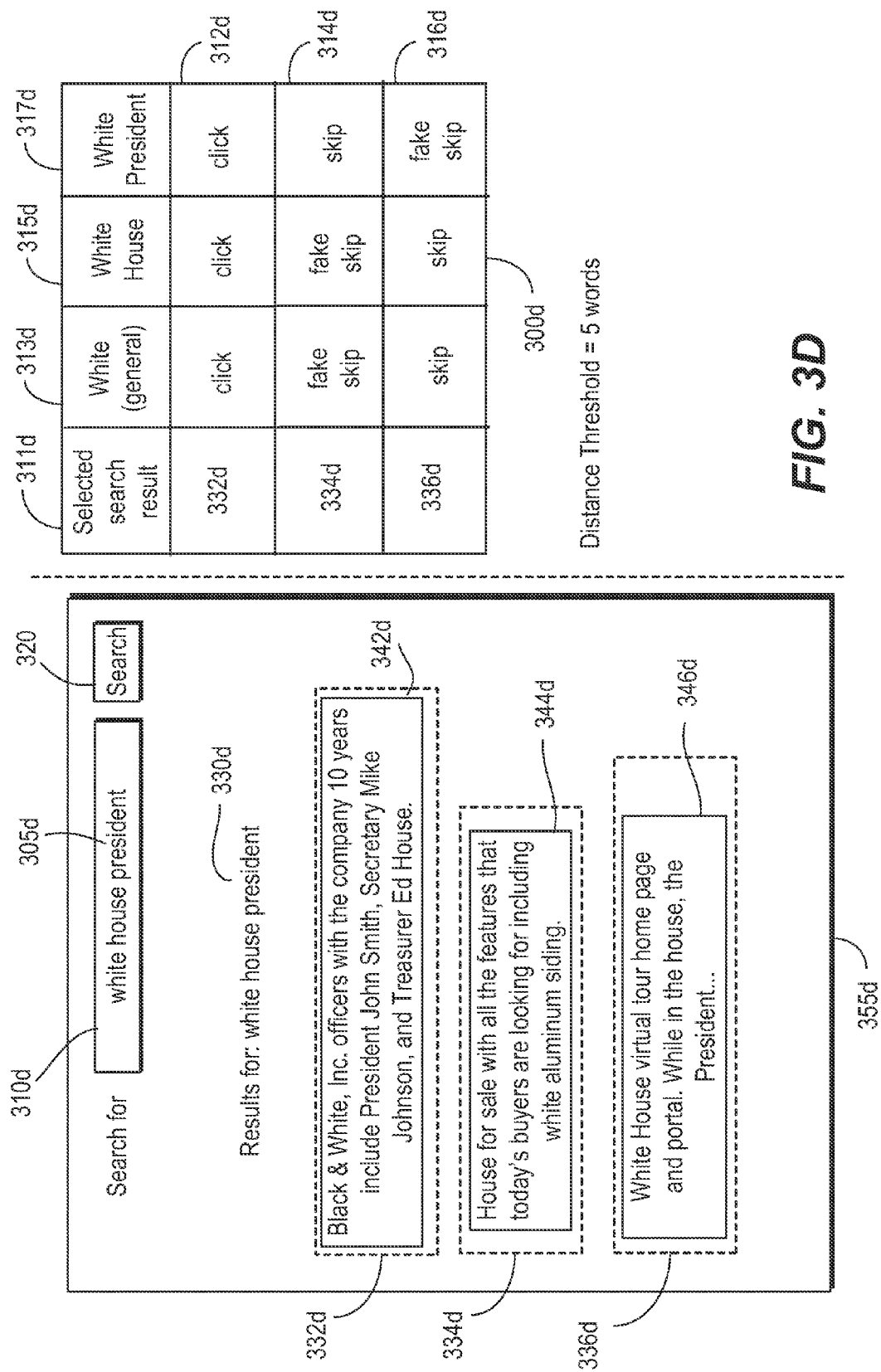

FIG. 3D illustrates an example search results page 355d and a table 300d that shows the example result of evaluating proximity rules using click and skip evaluation. The search results page 355d presents a ranked list of search results in response to a query 305d ("white house president") entered into a search box 310. The search results page can include a control element 320 (e.g. a button) for initiating a search. Each search result 332d, 334d, and 336d includes search result text (e.g. "Black & White, Inc. officers with the company 10 years include President John Smith, Secretary Mike Johnson, and Treasurer Ed White" 342d).

In row 312d of table 300d, search result 332d has been selected by a user. Search result text 342d contains the query terms "white," "house," and "president." "White" is at least five words from "house" and "president." Therefore, column 313d illustrates a "click" because "white" is at least five words from any other query term. Column 315d illustrates a "click" because "white" is at least five words from "house." Column 317d illustrates a "click" because "white" is at least five words from "president."

In row 314d of table 300d, search result 334d has been selected by a user. Search result text 344d contains the query terms "white" and "house." "President" does not appear. "White" is at least five words from "house." Therefore, column 313d illustrates a "fake skip" because "white" is at least five words from any other query term in both search result texts 342d and 344d. Column 315d illustrates a "fake skip" because "white" is at least five words from "house" in both search result texts 342d and 344d. Column 317d illustrates a "skip" because "white" is at least five words from "president" in search result text 342d and "president" does not appear in search result text 344d.

In row 316d of table 300d, search result 336d has been selected by a user. Search result text 346d contains the query terms "white," "house," and "president." "White" is at least five words from "president" and both at least five words and within five words of "house." As noted above, the small distance is used for click and skip evaluation. Therefore, column 313d illustrates a "skip" because "white" is within five words of any other query term in search result text 346d and is at least five words from any other query term in search result texts 342d and 344d. Column 315d illustrates a "skip" because "white" is within five words of "house" in search result text 346d and is at least five words from "house" in both search result text 342d and 344d. Column 317d illustrates a "fake skip" because "white" is at least five words from "president" in both search result texts 342d and 346d.

Figure 3E:
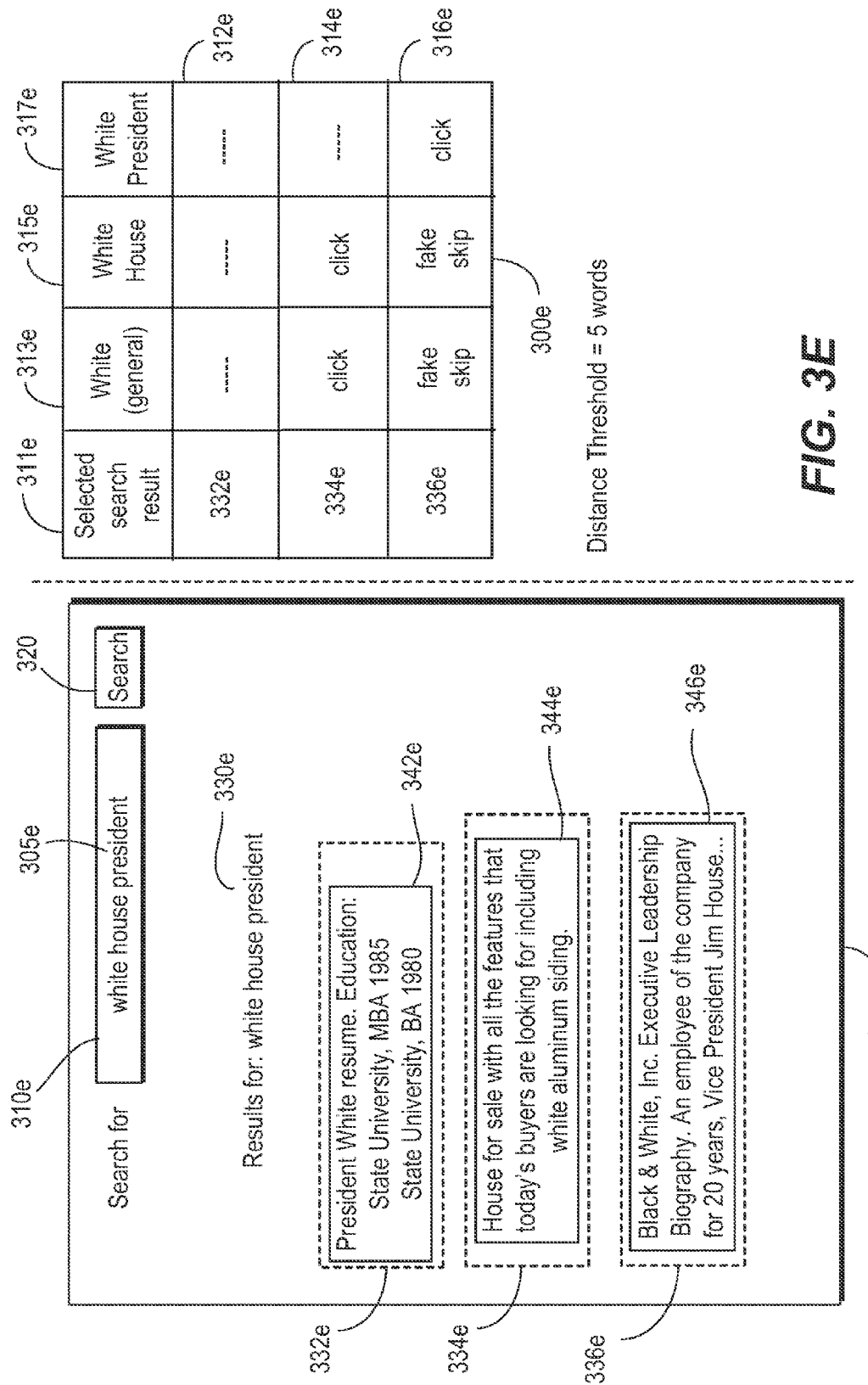

FIG. 3E illustrates an example search results page 355e and a table 300e that shows the example result of evaluating proximity rules using click and skip evaluation. The search results page 355e presents a ranked list of search results in response to a query 305e ("white house president") entered into a search box 310. The search results page can include a control element 320 (e.g. a button) for initiating a search. Each search result 332e, 334e, and 336e includes search result text (e.g. "President White resume. Education: State University, MBA 1985 State University, BA 1980" 342e).

In row 312e of table 300e, search result 332e has been selected by a user. Search result text 342e contains the query terms "white" and "president." "House" does not appear. "White" is within five words of "president." Therefore, column 313e illustrates neither a "click" nor a "skip" because "white" is within five words of any other query term. Column 315e illustrates neither a "click" nor a "skip" because "house" does not appear in search result text 342e. Column 317e illustrates neither a "click" nor a "skip" because "white" is within five words of "president."

In row 314e of table 300e, search result 334e has been selected by a user. Search result text 344e contains the query terms "white" and "house." "President" does not appear. "White" is at least five words from "house." Therefore, column 313e illustrates a "click" because "white" is at least five words from any other query term in search result text 344e and "white" is not at least five words from any other query term in a higher ranked search result text. Column 315e illustrates a "click" because "white" is at least five words from "house" in search result text 344e and "white" is not at least five words from "house" in search result text 342e. Column 317e illustrates neither a "click" nor a "skip" because "president" does not appear in search result text 344e and "white" is not at least five words from "president" in search result 342e.

In row 316e of table 300e, search result 336e has been selected by a user. Search result text 346e contains the query terms "white," "house," and "president." "White" is at least five words from "president" and "house." Therefore, column 313e illustrates a "fake skip" because "white" is at least five words from any other query term in both search result texts 346e and 344e. Column 315e illustrates a "fake skip" because "white" is at least five words from "house" in both search result text 344e and 346e. Column 317e illustrates neither a "click" because "white" is at least five words from "president" in search result text 346e and "white" is not at least five words from "president" in a higher ranked search result text.

Figure 4:
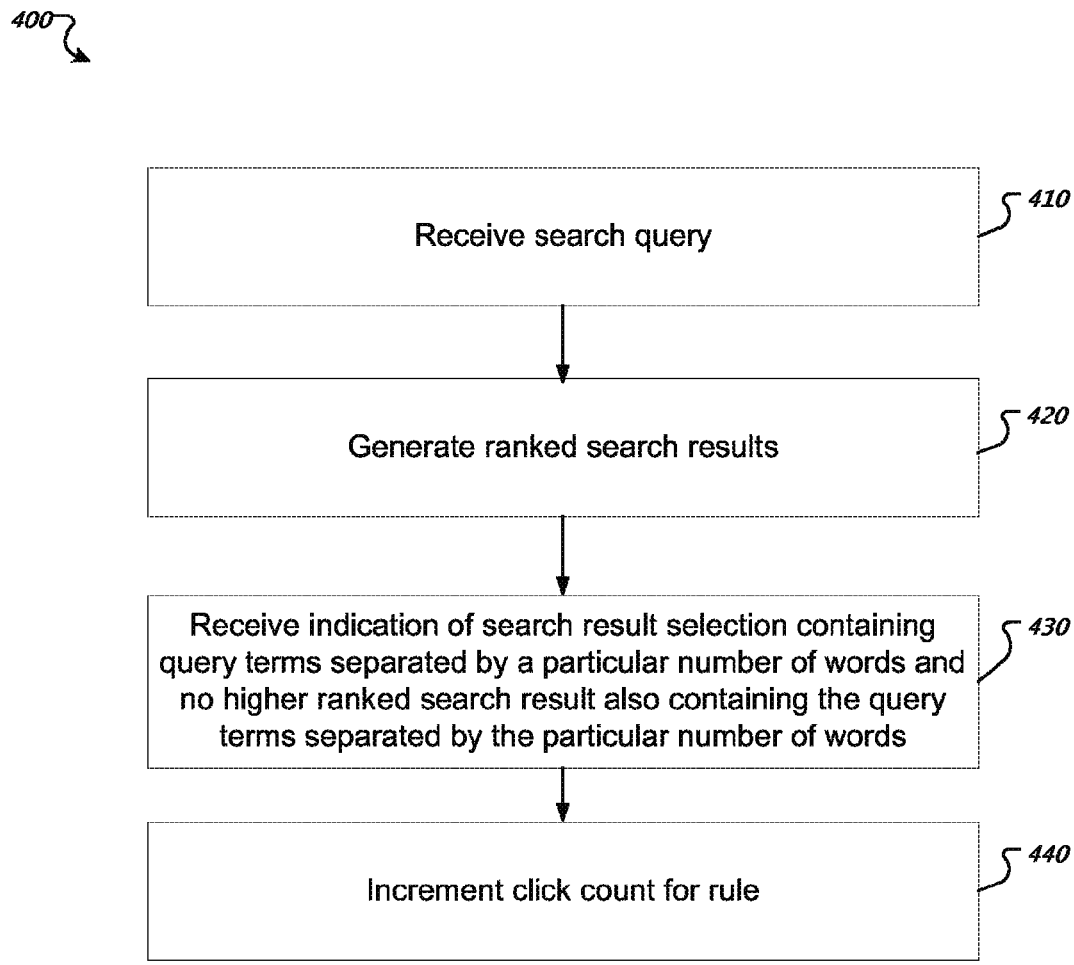
FIGS. 4, 5, and 6 are flow charts of example processes for evaluating proximity rules using click and skip evaluation.

FIG. 4 is a flow chart of an example process 400 for evaluating proximity rules using click and skip evaluation. In general, the process 400 analyzes user interaction with a provided set of search results that were identified using revised queries generated using proximity rules. The process 400 will be described as being performed by a computer system comprising one or more computers, for example, the search system 130 as shown in FIG. 1.

The system receives and initial search query including a particular query term and one or more other query terms (410). For each search query, the system can identify proximity rules to be used for retrieving search results.

The system generates search results using the initial search query (420). The system can use the retrieved search results to generate a search results page that is forwarded for display by a client device.

The system receives an indication that the user has selected a particular search result (430). The system determines that the particular search result includes the particular query term separated from the other query terms by at least a predetermined number of words. The system also determines that there is not a higher ranked search result that also includes the particular search result separated from the other query terms by at least a predetermined number of words. In some implementations, instead of analyzing only the provided search result, the system analyzes the entire indexed document for the separation of the query terms.

The system increments a click count for the proximity rule that corresponds a query term proximity rule associated with the particular query term (440). The system can combine one or multiple click and skip counts into a single score for the proximity rule. Each count can have an associated weight. For example, the system can weight the click count five times more significant than the skip count.

In some implementations, the system computes a score based on a ratio of click counts to skip counts. The system can then use the score to adjust a confidence score for the particular proximity rule. The system can also remove a proximity rule whose score did not exceed a threshold. In other words, subsequently generated search results will not be scored based on the removed proximity rule.

In some implementations, the system can compute click counts and skip counts for a particular proximity rule offline by processing data stored in a query log. Query logs store anonymized data regarding provided search results for a certain period of time (e.g. a week). Query data may, in some implementations, be data that is stored and retrieved from a query log. Query data can include, for example, an initial search query, original query terms separated by a particular number of words, the search results retrieved by the initial search query and by the original query terms separated by a particular number of words, and one or more search results that were selected by a user.

By using query data, the system can compute confidence scores using click counts and skip counts offline instead of waiting for real-time interaction with provided search results. The system can process query data periodically to compute scores for proximity rules and remove or adjust confidence scores of proximity rules as needed.

Figure 5:
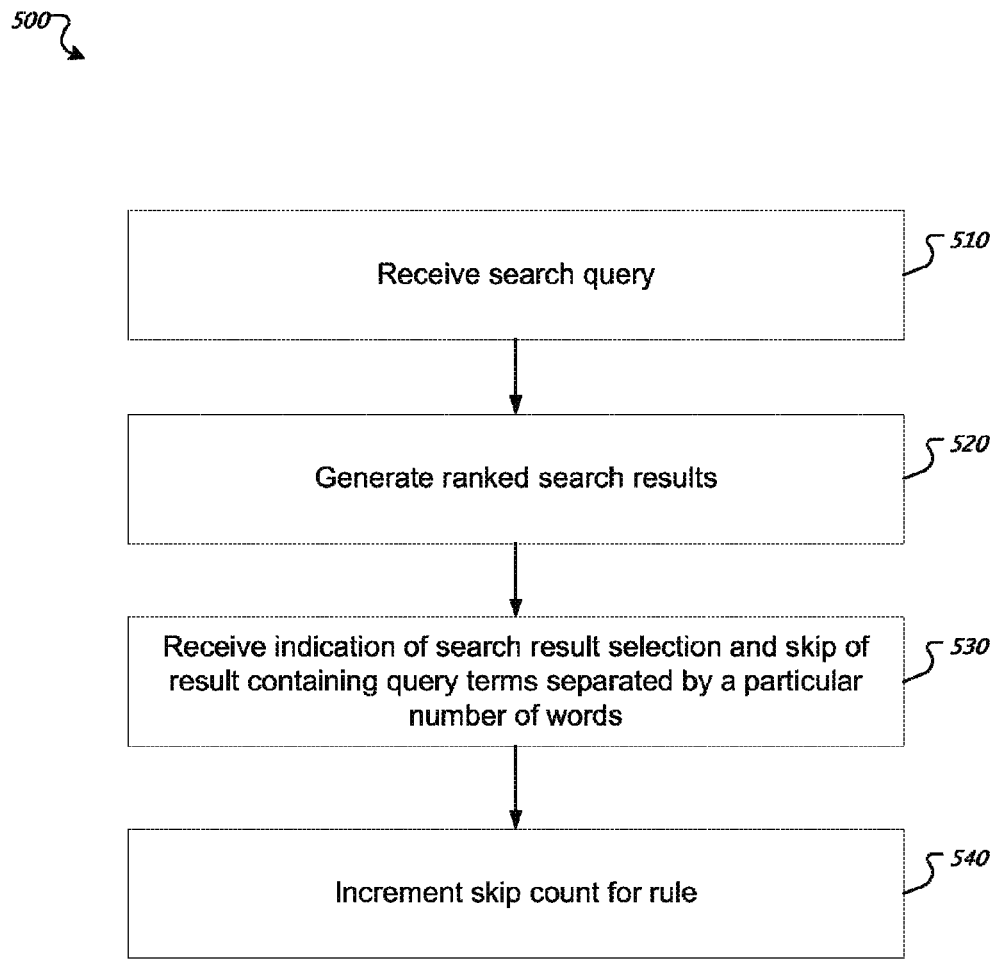

FIG. 5 is a flow chart of an example process 500 for evaluating proximity rules using click and skip evaluation. In general, the process 500 analyzes user interaction with a provided set of search results that were identified using revised queries generated using proximity rules. The process 500 will be described as being performed by a computer system comprising one or more computers, for example, the search system 130 as shown in FIG. 1.

The system receives and initial search query including a particular query term and one or more other query terms (510). For each search query, the system can identify proximity rules to be used for retrieving search results.

The system generates search results using the initial search query (520). The system can use the retrieved search results to generate a search results page that is forwarded for display by a client device.

The system receives an indication that the user has selected a particular search result (530). The system determines that the particular search result does not include the particular query term separated from the other query terms by at least a predetermined number of words. The system also determines that there is a higher ranked search result that includes the particular query term separated from the other query terms by at least a predetermined number of words. In some implementations, instead of analyzing only the provided search result, the system analyzes the entire indexed document for the separation of the query terms.

The system increments a skip count for the proximity rule that corresponds a query term proximity rule associated with the particular query term (540). The system can combine one or multiple click and skip counts into a single score for the proximity rule. Each count can have an associated weight. For example, the system can weight the click count five times more significant than the skip count.

Figure 6:
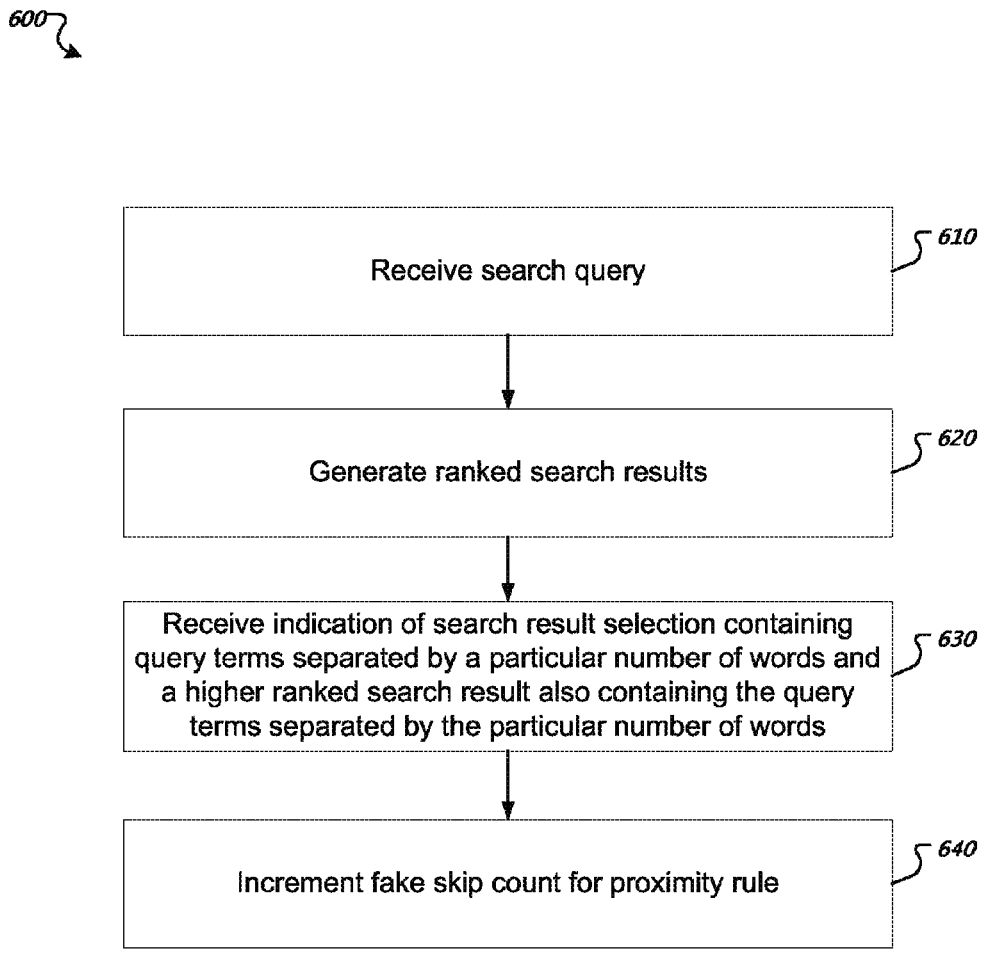

FIG. 6 is a flow chart of an example process 600 for evaluating proximity rules using click and skip evaluation. In general, the process 600 analyzes user interaction with a provided set of search results that were identified using revised queries generated using a particular proximity rule. The process 600 will be described as being performed by a computer system comprising one or more computers, for example, the search system 130 as shown in FIG. 1.

The system receives and initial search query including a particular query term and one or more other query terms (610). For each search query, the system can identify proximity rules to be used for retrieving search results.

The system generates search results using the initial search query (620). The system can use the retrieved search results to generate a search results page that is forwarded for display by a client device.

The system receives an indication that the user has selected a particular search result (630). The system determines that the particular search result includes the particular query term separated from the other query terms by at least a predetermined number of words. The system also determines that there is a higher ranked search result that also includes the particular query term separated from the other query terms by at least a predetermined number of words. In some implementations, instead of analyzing only the provided search result, the system analyzes the entire indexed document for the separation of the query terms.

The system increments a fake skip count for the proximity rule that corresponds a query term proximity rule associated with the particular query term (640). The system can combine one or multiple click and skip counts into a single score for the proximity rule. Each count can have an associated weight. For example, the system can weight the click count five times more significant than the skip count.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   accessing query log data that identifies, for a search query:
      a particular query term and one or more other query terms that are included in the search query,
      search results that were generated using the search query,
      a ranking of the search results that were generated using the search query, and
      a particular search result selected by a user from among the search results that were generated using the search query;
   determining, using the query kg data, that, (i) in text associated with the particular search result selected by the user, the particular query term is separated from all of the one or more other query terms by at least a predetermined minimum number of terms, and (ii) in text associated with a search result that was ranked higher than the particular search result selected by the user, the particular query term is not separated from all of the one or more other query terms by at least the predetermined minimum number of terms; and based on the determination, incrementing a click count for a query term proximity rule corresponding to the particular query term.

2. The method of claim 1, comprising assigning a score to the query term proximity rule based on the click count, a skip count, and a fake skip count.

3. The method of claim 2, wherein the score for the query term proximity rule is based on a ratio of (i) the click count to (ii) the click count, the skip count, and the fake skip count.

4. The method of claim 2, further comprising:
determining that the score for the query term proximity rule does not meet a threshold; and
removing the query term proximity rule from a set of query term proximity rules used to generate revised search queries based on determining that the score for the query term proximity rule does not meet the threshold.

5. The method of claim 2, associating a first weight with the click count, a second weight with the skip count, and a third weight associated with the fake skip count.

6. The method of claim 5, wherein the score for the query term proximity rule satisfies $$\frac{(\text{click\_count} * W1)}{(\text{click\_count} * W1) + (\text{skip\_count} * W2) + (\text{fake\_skip\_count} * W3)}$$

wherein W1 represents the first weight associated with the click count, W2 represents the second weight associated with the skip count, and W3 represents the third weight associated with the fake skip count.

7. The method of claim 1, wherein the query term proximity rule comprises a query term revision rule for revising search queries by separating the particular query term and the one or more other query terms by a particular number of words.

8. The method of claim 1, wherein the query term proximity rule comprises a query term scoring rule for scoring separation of the particular query term and the one or more other query terms that occur in resources that are identified in response to search queries.

9. A system comprising:
one or more computers and one or more storage devices storing instructions that are operable, when executed by the one or more computers, to cause the one or more computers to perform operations comprising:
accessing query log data that identifies, for a search query:
a particular query term and one or more other query terms that are included in the search query,
search results that were generated using the search query,
a ranking of the search results that were generated using the search query, and
a particular search result selected by a user from among the search results that were generated using the search query;
determining, using the query log data, that, (i) in text associated with the particular search result selected by the user, the particular query term is separated from all of the one or more other query terms by at least a predetermined minimum number of terms, and (ii) in text associated with a search result that was ranked higher than the particular search result selected by the user, the particular query term is not separated from all of the one or more other query terms by at least the predetermined minimum number of terms; and
based on the determination, incrementing a click count for a query term proximity rule corresponding to the particular query term.

10. The system of claim 9, the operations further comprising assigning a score to the query term proximity rule based on the click count, a skip count, and a fake skip count.

11. The system of claim 10, wherein the score for the query term proximity rule is based on a ratio of (i) the click count to (ii) the click count, the skip count, and the fake skip count.

12. The system of claim 10, the operations further comprising:
determining that the score for the query term proximity rule does not meet a threshold; and
removing the query term proximity rule from a set of query term proximity rules used to generate revised search queries based on determining that the score for the query term proximity rule does not meet the threshold.

13. The system of claim 10, associating a first weight with the click count, a second weight with the skip count, and a third weight with the fake skip count.

14. The system of claim 13, wherein the score for the query term proximity rule satisfies $$\frac{(\text{click\_count} * W1)}{(\text{click\_count} * W1) + (\text{skip\_count} * W2) + (\text{fake\_skip\_count} * W3)}$$

wherein W1 represents the first weight associated with the click count, W2 represents the second weight associated with the skip count, and W3 represents the third weight associated with the fake skip count.

15. The system of claim 9, wherein the query term proximity rule comprises a query term revision rule for revising search queries by separating the particular query term and the one or more other query terms by a particular number of words.

16. The system of claim 9, wherein the query term proximity rule comprises a query term scoring rule for scoring separation of the particular query term and the one or more other query terms that occur in resources that are identified in response to search queries.

17. A non-transitory computer-readable medium storing software comprising instructions executable by one or more computers which, upon such execution, cause the one or more computers to perform operations comprising:
accessing query log data that identifies, for a search query:
a particular query term and one or more other query terms that are included in the search query,
search results that were generated using the search query,
a ranking of the search result that were generated using the search query, and
a particular search result selected by a user from among the search results that were generated using the search query;
determining, using the query kg data, that, (i) in text associated with the particular search result selected by the user, the particular query term is separated from all of the one or more other query terms by at least a predetermined minimum number of terms, and (ii) in text associated with a search result that was ranked higher than the particular search result, the particular query term is not separated from all of the one or more other query terms by at least the predetermined minimum number of terms; and based on the determination, incrementing a click count for a query term proximity rule corresponding to the particular query term.

18. The medium of claim 17, the operations further comprising assigning a score to the query term proximity rule based on the click count, a skip count, and a fake skip count.

19. The medium of claim 18, wherein the score for the query term proximity rule is based on a ratio of (i) the click count to (ii) the click count, the skip count, and the fake skip count.

20. The medium of claim 18, the operations further comprising:
  determining that the score for the query term proximity rule does not meet a threshold; and
  removing the query term proximity rule from a set of query term proximity rules used to generate revised search queries based on determining that the score for the query term proximity rule does not meet the threshold.

21. The medium of claim 18, associating a first weight with the click count, a second weight with the skip count, and a third weight with the fake skip count.

22. The medium of claim 21, wherein the score for the query term proximity rule satisfies $$\frac{(\text{click\_count} * W1)}{(\text{click\_count} * W1) + (\text{skip\_count} * W2) + (\text{fake\_skip\_count} * W3)}$$

wherein W1 represents the first weight associated with the click count, W2 represents the second weight associated with the skip count, and W3 represents the third weight associated with the fake skip count.

23. The medium of claim 17, wherein the query term proximity rule comprises a query term revision rule for revising search queries by separating the particular query term and the one or more other query terms by a particular number of words.

24. The medium of claim 17, wherein the query term proximity rule comprises a query term scoring rule for scoring separation of the particular query term and the one or more other query terms that occur in resources that are identified in response to search queries.

25. A computer-implemented method comprising:
  accessing query data that identifies, for a search query:
    a particular query term and one or more other query terms that are included in the search query,
    search results that were generated using the search query,
    a ranking of the search results that were generated using the search query, and
    a particular search result selected by a user from among the search results that were generated using the search query;
  determining, using the query log data, that, (i) in text associated with the particular search result selected by the user, the particular query term is not separated from all of the one or more other query terms by at least a predetermined minimum number of terms, and (ii) in text associated with a search result that is ranked higher than the particular search result selected by the user, the particular query term is separated from all of the one or more other query terms by at least the predetermined minimum number of terms; and
  based on the determination, incrementing a skip count for a query term proximity rule corresponding to the particular query term.

26. The method of claim 25, comprising assigning a score to the query term proximity rule based on a click count, the skip count, and a fake skip count.

27. The method of claim 26, wherein the score for the query term proximity rule is based on a ratio of (i) the click count to (ii) the click count, the skip count, and the fake skip count.

28. The method of claim 26, further comprising:
  determining that the score for the query term proximity rule does not meet a threshold; and
  removing the query term proximity rule from a set of query term proximity rules used to generate revised search queries based on determining that the score for the query term proximity rule does not meet the threshold.

29. The method of claim 26, associating a first weight with the click count, a second weight with the skip count, and a third weight with the fake skip count.

30. The method of claim 29, wherein the score for the query term proximity rule satisfies $$\frac{(\text{click\_count} * W1)}{(\text{click\_count} * W1) + (\text{skip\_count} * W2) + (\text{fake\_skip\_count} * W3)}$$

wherein W1 represents the first weight associated with the click count, W2 represents the second weight associated with the skip count, and W3 represents the third weight associated with the fake skip count.

31. The method of claim 25, wherein the query term proximity rule comprises a query term revision rule for revising search queries by separating the particular query term and the one or more other query terms by a particular number of words.

32. The method of claim 25, wherein the query term proximity rule comprises a query term scoring rule for scoring separation of the particular query term and the one or more other query terms that occur in resources that are identified in response to search queries.

33. The method of claim 1, comprising:
  after incrementing the click count for the query term proximity rule, determining, based at least on the click count for the query term proximity rule, to revise a subsequently-received search query that includes the particular query term and one or more other query terms using the query term proximity rule; and
  in response to determining to revise the subsequently-received search query, revising the subsequently-received search query using the query term proximity rule.

34. The method of claim 1, comprising:
  after incrementing the click count for the query term proximity rule and based at least on the click count for the query term proximity rule, adjusting the rank of a search result included among search results that are generated using a subsequently-received search query that includes the particular query term and one or more other query terms.

* * * * *